US012639628B2

(12) United States Patent
Cresswell et al.

(10) Patent No.: US 12,639,628 B2
(45) Date of Patent: May 26, 2026

(54) DISTRIBUTED MODEL TRAINING WITH COLLABORATION WEIGHTS FOR PRIVATE DATA SETS

(71) Applicant: THE TORONTO-DOMINION BANK, Toronto (CA)

(72) Inventors: Jesse Cole Cresswell, Toronto (CA); Brendan Leigh Ross, Toronto (CA); Ka Ho Yenson Lau, Toronto (CA); Junfeng Wen, Waterloo (CA); Yi Sui, Newmarket (CA)

(73) Assignee: The Toronto-Dominion Bank, Toronto (CA)

( * ) Notice: Subject to any disclaimer, the term of this patent is extended or adjusted under 35 U.S.C. 154(b) by 560 days.

(21) Appl. No.: 18/202,459

(22) Filed: May 26, 2023

(65) Prior Publication Data

US 2023/0385694 A1     Nov. 30, 2023

Related U.S. Application Data

(60) Provisional application No. 63/350,342, filed on Jun. 8, 2022, provisional application No. 63/346,820, filed on May 27, 2022.

(51) Int. Cl.
   *G06F 7/00*     (2006.01)
   *G06F 17/00*    (2019.01)
   *G06N 20/00*   (2019.01)
(52) U.S. Cl.
   CPC .................................. *G06N 20/00* (2019.01)
(58) Field of Classification Search
   None
   See application file for complete search history.

(56) References Cited

U.S. PATENT DOCUMENTS

| | | |
|---|---|---|
| 2019/0294864 A1 | 9/2019 | Chabanne et al. |
| 2021/0073677 A1 | 3/2021 | Peterson et al. |
| 2021/0073678 A1 | 3/2021 | Chu et al. |
| 2022/0237898 A1 | 7/2022 | Uehara |

OTHER PUBLICATIONS

International Search Report and Written Opinion issued in PCT/CA2023/050728 on Aug. 9, 2023; 8 pages.
Acar, et al., "Debiasing Model Updates for Improving Personalized Federated Training," Proceedings of the 38th International Conference on Machine Learning, 2021, 11 pages; http://proceedings.mlr.press/v139/acar21a/acar21a.pdf.

(Continued)

*Primary Examiner* — Tuan A Pham
(74) *Attorney, Agent, or Firm* — Hopewell IP, P.C.

(57) ABSTRACT

Model training systems collaborate on model training without revealing respective private data sets. Each private data set learns a set of client weights for a set of computer models that are also learned during training. Inference for a particular private data set is determined as a mixture of the computer model parameters according to the client weights. During training, at each iteration, the client weights are updated in one step based on how well sampled models represent the private data set. In another step, gradients are determined for each sampled model and may be weighed according to the client weight for that model, relatively increasing the gradient contribution of a private data set for model parameters that correspond more highly to that private data set.

17 Claims, 8 Drawing Sheets

(56)                References Cited

OTHER PUBLICATIONS

Arivazhagan, et al., "Federated Learning with Personalization Layers," arXiv:1912.00818v1 [cs.LG], Dec. 2, 2019, 13 pages; https://arxiv.org/pdf/1912.00818.pdf.
Corinzia, et al., "Variational Federated Multi-Task Learning," arXiv:1906.06268v2 [cs.LG], Feb. 4, 2021, 12 pages; https://arxiv.org/pdf/1906.06268.pdf.
Dempster, et al., "Maximum Likelihood from Incomplete Data via the EM Algorithm," Journal of the Royal Statistical Society, Series B (Methodological), vol. 39, No. 1, pp. 1-38, 1977,39 pages; https://cs.brown.edu/courses/csci1820/resources/Dempster_Laird_Rubin_1977.pdf.
Deng, et al., "Adaptive Personalized Federated Learning," arXiv:2003.13461v3 [cs.LG], Nov. 6, 2020, 50 pages; https://arxiv.org/pdf/2003.13461.pdf.
Dinh, et al., "Personalized Federated Learning with Moreau Envelopes," 34th Conference on Neural Information Processing Systems, arXiv:2006.08848v3 [cs.LG], Jan. 26, 2022, 23 pages; https://arxiv.org/pdf/2006.08848.pdf.
Fallah, et al., "Personalized Federated Learning with Theoretical Guarantees: A Model-Agnostic Meta-Learning Approach," 34th Conference on Neural Information Processing Systems, 2020, 12 pages; https://proceedings.neurips.cc/paper/2020/file/24389bfe4fe2eba8bf9aa9203a44cdad-Paper.pdf.
Ghosh, et al., "An Efficient Framework for Clustered Federated Learning," arXiv:2006.04088v2 [stat.ML], Jun. 8, 2021, 28 pages; https://arxiv.org/pdf/2006.04088.pdf.
Hanzely, et al., "Federated Learning of a Mixture of Global and Local Models," arXiv:2002.05516v3 [cs.LG], Feb. 12, 2021, 40 pages; https://arxiv.org/pdf/2002.05516.pdf.
Huang, et al., "Personalized Cross-Silo Federated Learning on Non-IID Data," 35th AAAI Conference on Artificial Intelligence, vol. 35, No. 9, pp. 7865-7873, arXiv:2007.03797v5 [cs.LG], Dec. 14, 2021, 9 pages; https://arxiv.org/pdf/2007.03797.pdf.
Jiang, et al., "Improving Federated Learning Personalization via Model Agnostic Meta Learning," arXiv:1909.12488v2 [cs.LG], Jan. 18, 2023, 11 pages; https://arxiv.org/pdf/1909.12488.pdf.
Kairouz, et al., "Advances and Open Problems in Federated Learning," Foundations and Trends® in Machine Learning, vol. 14, No. 1-2, arXiv:1912.04977v3 [cs.LG], Mar. 9, 2021, 121 pages; https://arxiv.org/pdf/1912.04977.pdf.
Kalra, et al., "ProxyFL: Decentralized Federated Learning Through Proxy Model Sharing," arXiv:2111.11343v2 [cs.LG], Dec. 16, 2021, 16 pages; https://assets.researchsquare.com/files/rs-1168002/v1_covered.pdf?c=1639662082.
Khodak, et al., "Adaptive Gradient-Based Meta-Learning Methods," 33rd Conference on Neural Information Processing Systems 32, arXiv:1906.02717v3 [cs.LG], Dec. 7, 2019, 42 pages; https://arxiv.org/pdf/1906.02717.pdf.
Krizhevsky, A., "Learning Multiple Layers of Features from Tiny Images," University of Toronto, Ontario, Apr. 8, 2009, 60 pages; https://www.cs.toronto.edu/~kriz/learning-features-2009-TR.pdf.

Kulkarni, et al., "Survey of Personalization Techniques for Federated Learning," 2020 Fourth World Conference on Smart Trends in Systems, Security and Sustainability, pp. 794-797, arXiv:2003.08673v1 [cs.LG}, Mar. 19, 2020, 4 pages; https://arxiv.org/pdf/2003.08673.pdf.
Li, et al., "Decentralized Federated Learning via Mutual Knowledge Transfer," IEEE Internet of Things Journal, vol. 9, No. 2, May 12, 2021, 12 pages; https://arxiv.org/ftp/arxiv/papers/2012/2012.13063.pdf.
Li, et al., "Ditto: Fair and Robust Federated Learning Through Personalization," Proceedings of the 38th International Conference on Machine Learning, arXiv:2012.04221v3 [cs.LG], Jun. 15, 2021, 32 pages; https://arxiv.org/ pdf/2012.04221.pdf.
Long, et al., "Federated Learning for Open Banking," arXiv:2108.10749v1 [cs.DC], Aug. 24, 2021, 15 pages; https://arxiv.org/pdf/2108.10749.pdf.
Mansour, et al., "Three Approaches for Personalization with Applications to Federated Learning," arXiv:2002.10619v2 [cs.LG], Jul. 19, 2020, 26 pages; https://arxiv.org/pdf/2002.10619.pdf.
Marfoq, et al., "Federated Multi-Task Learning Under a Mixture of Distributions," 35th Conference on Neural Information Processing Systems, arXiv:2108.10252v4 [cs.LG], Nov. 7, 2022, 77 pages; https://arxiv.org/pdf/2108.10252.pdf.
Mcmahan, et al., "Communication-Efficient Learning of Deep Networks from Decentralized Data," 20th International Conference on Artificial Intelligence and Statistics, arXiv:1602.05629v4 [cs.LG], Jan. 26, 2023, 11 pages; https://arxiv.org/pdf/1602.05629.pdf.
Sadilek, et al., "Privacy-First Health Research with Federated Learning," NPJ Digital Medicine, vol. 4, No. 1, pp. 132, Sep. 7, 2021, 8 pages; https://www.nature.com/articles/s41746-021-00489-2.
Sattler, et al., "Clustered Federated Learning: Model-Agnostic Distributed Multitask Optimization Under Privacy Constraints," IEEE Transactions on Neural Networks and Learning Systems, vol. 32, No. 8, arXiv:1910.01991v1 [cs.LG], Oct. 4, 2019, 16 pages; https://arxiv.org/pdf/1910.01991.pdf.
Shen, et al., "Federated Mutual Learning," arXiv:2006.16765v3 [cs.LG], Sep. 17, 2020, 12 pages; https://arxiv.org/pdf/2006.16765.pdf.
Smith, et al., "Federated Multi-Task Learning," 31st Conference on Neural Information Processing Systems, arXiv:1705.10467v2 [cs.LG], Feb. 27, 2018, 19 pages; https://arxiv.org/pdf/1705.10467.pdf.
Tan, et al., "Towards Personalized Federated Learning," IEEE Transactions on Neural Networks and Learning Systems, arXiv:2103.00710v3 [cs.LG], Mar. 17, 2022, 17 pages; https://arxiv.org/pdf/2103.00710.pdf.
Venkateswara, et al., "Deep Hashing Network for Unsupervised Domain Adaptation," IEEE conference on computer vision and pattern recognition, pp. 5018-5027, 2017, 10 pages; https://openaccess.thecvf.com/content_cvpr_2017/papers/Venkateswara_Deep_Hashing_Network_CVPR_2017_paper.pdf.
Zhang, et al., "Personalized Federated Learning with First Order Model Optimization," International Conference on Learning Representations 2021, arXiv:2012.08565v4 [cs.LG], Mar. 26, 2021, 17 pages; https://arxiv.org/pdf/2012.08565.pdf.
Zhao, et al., "Federated Learning with Non-IID Data," arXiv preprint arXiv:1806.00582v2 [cs.LG], Jul. 21, 2022, 12 pages; https://arxiv.org/pdf/1806.00582.pdf.

Select Model Sampling and Exchange

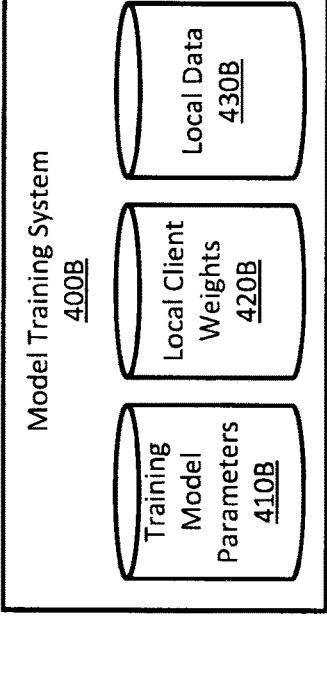

Model Training System 400B

Training Model Parameters 410B

Local Client Weights 420B

Local Data 430B

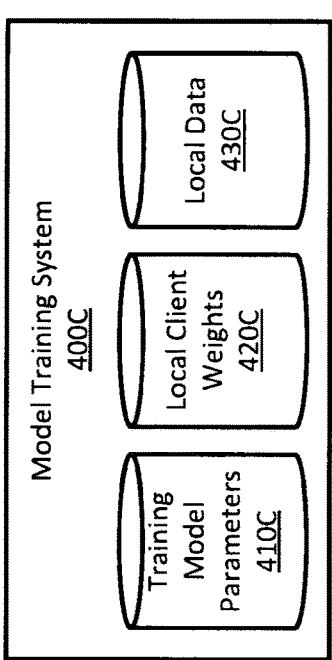

Model Training System 400C

Training Model Parameters 410C

Local Client Weights 420C

Local Data 430C

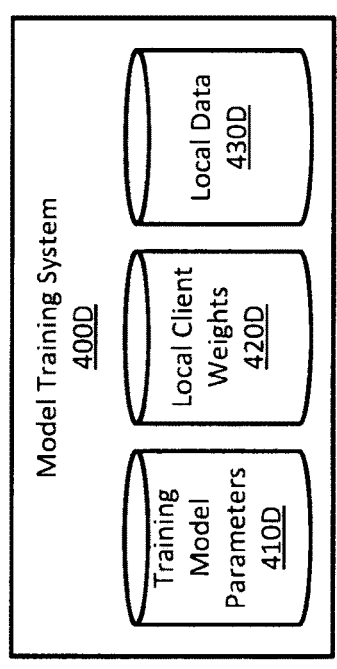

Model Training System 400D

Training Model Parameters 410D

Local Client Weights 420D

Local Data 430D

FIG. 4B

Select Model Sampling and Exchange

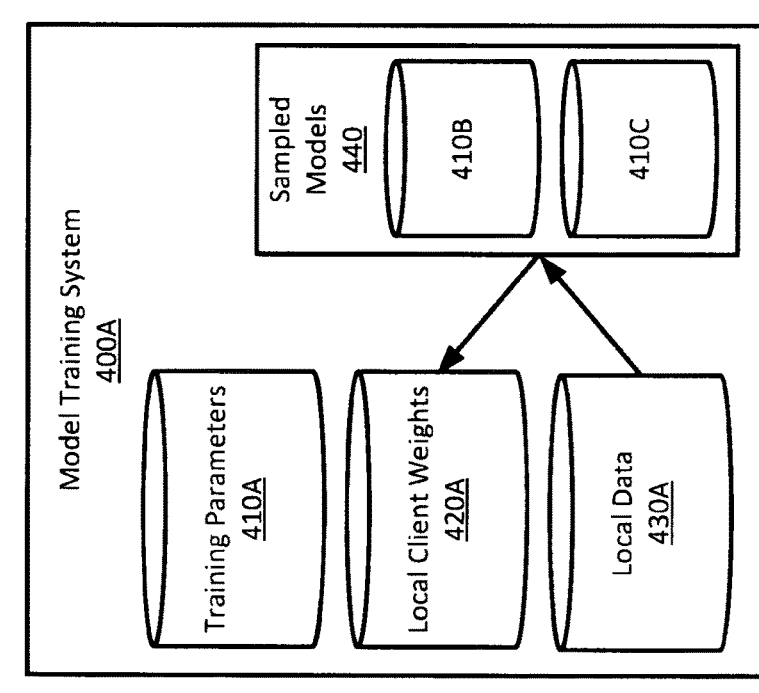

Model Training System 400A

Sampled Models 440

410B

410C

Training Parameters 410A

Local Client Weights 420A

Local Data 430A

DISTRIBUTED MODEL TRAINING WITH COLLABORATION WEIGHTS FOR PRIVATE DATA SETS

CROSS-REFERENCE TO RELATED APPLICATIONS

This application claims the benefit of U.S. Provisional Application No. 63/346,820, filed May 27, 2022, and U.S. Provisional Application No. 63/350,342, filed Jun. 8, 2022, the contents of each of which are hereby incorporated by reference in the entirety.

BACKGROUND

This disclosure relates generally to collaborative model training, and more particularly to performing collaborative model training with private data that is not shared across collaborators.

Collaborative learning refers to various processes that may be used to learn computer models that effectively learn parameters from decentralized datasets. This approach has been successfully implemented in practice for developing machine learning models without direct access to client data, which is crucial in heavily regulated industries such as banking and healthcare. For example, multiple hospitals that collect patient data may desire to merge their datasets for increased data diversity, to increase training data size, encourage transfer learning across similar data sets or to otherwise improve performance of the trained data model(s). In many instances, these data sets cannot be directly shared, for example, to preserve privacy related to the individual members of the data sets. As such, in these collaborative learning environments, each party has a respective data set that cannot be shared with other parties, but where the data shares sufficient similarity that being able to incorporate information from multiple data sets would likely benefit model training.

In addition, statistical heterogeneity is a major and common practical challenge in collaborative learning, where each client may hold different data distributions. Prior approaches, such as Federated Averaging, have demonstrated promising performance with homogeneous client data. However, these methods often struggle to handle statistical heterogeneity for two main reasons. First, the variation in client distributions can lead to divergences in weight updates during training; second, it can be challenging for a single global model to provide optimal performance across all clients during inference.

SUMMARY

To improve collaborative learning, each private data set is treated as having an underlying data distribution that may have hidden relationships to other private data sets. To model these distributions, each private data set learns a set of "client weights" that define the respective weight for combining a set of models each having training parameters, such that the final interference model for a private data set is a mixture of these models' training parameters according to the client weights. The client weights, as well as the model parameters, are learned during model training. By enabling the final inference model to be a mixture of these models, a given private data set may take advantage of similarities with other private data sets as represented in similar client weights for a particular model. Perhaps just as importantly, the client weights may also learn which models are not beneficial for the private data. Together, these enable each private data set to learn the "right" coordinators, such that information from models (reflecting information gleaned from other private data sets) may be more-highly weighed when they are beneficial to the private data set and reduced when they are not. In addition, this information is learned without revealing private data sets to other participants, preserving entity privacy while benefiting from the collaboration.

To do so, a group of computer models each has a set of training parameters. Each entity participating in the collaborative training has a private data set. The number of computer models corresponds to the number of private data sets, and in some cases, each entity participating in the training is responsible for coordinating training of a local model. Each of the private data sets has a set of client weights, reflecting the respective weight of each of the computer models for modeling the private data set. Each of these client weights may reflect, for example, the likelihood that the model predicts the distribution of the private data set.

During training, the client weights and the model parameters are trained. In one embodiment, this training is distributed, such that each entity may update client weights for its private data set and manage parameter updates for one computer model. In each iteration, these may be alternated, such that the client weights are updated in one step (holding model parameters constant) and model update gradients are determined and applied in another step (holding client weights constant). To update client weights for a particular private data set, a number of the computer models are selected to be sampled in that iteration. In some embodiments, the models selected for sampling is based on the (prior) client weights; in one embodiment, a mixture may be selected that includes models sampled based on client weights and models sampled randomly. The current training parameters for the selected models are retrieved and applied to the private data to determine the extent to which that model's parameters may describe the private data set. In one example, a training loss for each sampled model is determined with respect to the private data and used to set the updated client weight for the private data set. The client weight may also be based on a moving average to reduce oversampling of models with a high client weight.

To update the models, each of the models sampled for a particular private data set may be applied to the private data set to determine an update gradient for parameters of the model. As several private data sets may have sampled the same model, the model update gradients may be weighed according to the client weight for the private data set, such that gradients for models that do not appear to predict the data set well may be proportionally reduced. Stated another way, gradients for models that predict the private data set well are more-heavily weighed (such that they may continue to improve), while gradients for models that predict the private data set poorly are reduced (which may prevent these gradients from significantly affecting a model that may have a relatively high client weight for a different private data set). As such, over many training iterations, the client weights and model parameters are updated to learn effective representations of the private data sets. After training, parameters for an inference model for a private data set is generated by combining the training parameters of the respective models according to the client weights for the private data set.

By selecting the most relevant models, each client can collaborate as much or as little as needed to represent the client's private data set and learn a personalized mixture model to fit the local data. Additionally, this can be performed in a fully decentralized manner with embodiments that do not require a central system to coordinate parameter updates or other data distribution.

BRIEF DESCRIPTION OF THE DRAWINGS

FIGS. 4A-D illustrate steps for an iteration of a training process for distributed model training with heterogenous private model data, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Architecture Overview

Figure 1:
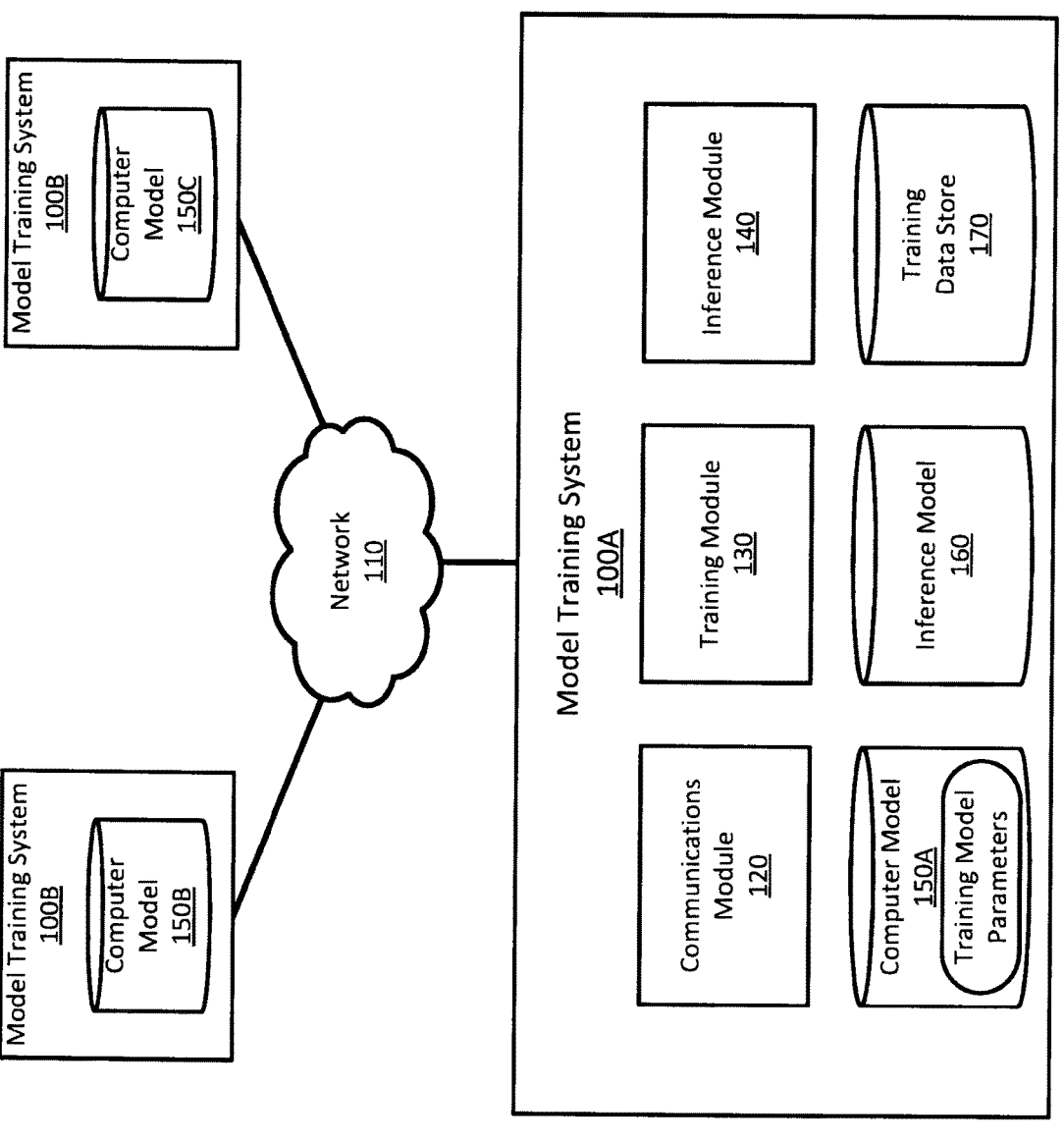
FIG. 1 shows an environment in which model training systems may share information about model training while maintaining the privacy of private data, according to one embodiment.

FIG. 1 shows an environment in which model training systems 100A-C may share information about model training while maintaining the privacy of private data, according to one embodiment. For simplicity of discussion, components are shown in FIG. 1 for model training system 100A; each other model training system such as model training system 100B, 100C may each have similar components. Each model training system 100A-C may represent an individual participant, client, or other entity that maintains a set of private data, at least a portion of which may be used as training data in a training data store 170. The private data may be sensitive, confidential, or other types of data that cannot be shared with other participants, such as medical, financial, or other types of data.

To enable the model training systems 100A-C to effectively train models that take advantage of data from other participants (and for others to benefit from each participants' private data), each model training system 100 trains parameters of a computer model 150 that may be shared with other participants. In this decentralized configuration, each model training system 100A-C may coordinate decentralized training of a set of computer models 150A-C. Across the participating systems, the number of computer models 150 may correspond to the number of participating model training systems 100 (i.e., and the number of private data sets). As discussed further below, each of the computer models (i.e., the respective computer model 150 at each model training system 100) learns a respective set of training parameters. During training, the training model parameters of the various computer models 150A-C may be shared with other model training systems. The computer models 150A-C share an architecture such that the model parameters of the various computer models are combinable as a weighted mixture without significant loss in efficacy. As such, in some embodiments, the model structure applies the parameters to yield a continuous (or substantially continuous) function that enables different parameter values to be combined without loss of model effectiveness.

Each computer model 150A-C is a machine-learned model that may have a number of layers for processing an input to generate predicted outputs. The particular architecture of the computer models 150A-C may vary in different embodiments and according to the type of data input and output by the models. The particular types of inputs and outputs may vary according to the type of training data. The input data may include high-dimensional images or three-dimensional imaging data, such as in various medical contexts and imaging modalities, and may include high-dimensional feature vectors of sequenced data (e.g., time-series data), such as in certain financial applications. The input data may include one or more different types of data that may be combined for input to the model, or the model may include branches that independently process the input data before additional layers combine characteristics from the branches. As such, the computer model 150 may have various types of architectures and thus include various types of layers having configurable parameters according to the particular application of the models. In many instances, the parameters represent weights for combining inputs to a particular layer of the model to determine an output of the model. Modifying the parameters may thus modify how the model processes the respective inputs for a layer to its outputs. As examples of types of layers, the models may include fully-connected layers, convolutional layers, pooling layers, activation layers, and so forth.

A particular input example may be referred to as a data instance, data record, or data sample, which may represent a "set" of input data that may be input to a model for which the model generates one or more output predictions. The output predictions may also vary in different embodiments according to the particular implementation and input data type. For example, in a medical context, one data item may include a radiological image along with a time-sequenced patient history. The output predictions may be a classification or rating of the patient as a whole with respect to a medical outcome, such as overall mortality risk or risk of a particular medical outcome, or may be a classification of regions of the image with respect to potential abnormalities, for example, outputting regions identified as having an elevated likelihood of an event for further radiologist review, or in some cases, specifically classifying a likelihood of a particular abnormality or risk. In these examples, the training data in the training data store 170 may include input data instances ($x_i$) along with labeled outputs ($y_i$) for each training data instance. The model training module 130 trains parameters of the computer model 150 and determines a set of client weights for the private data set to generate an inference model 160.

For each set of private training data (e.g., each particular entity's training data), a set of client weights is learned in conjunction with the set of computer models 150A-C. The client weights represent the extent to which each of the computer models 150A-C (according to application of its respective training parameters) describe the private data set. Stated another way, each client weight reflects a probability that the associated computer model 150 generates input-output relationships resembling the data samples (each having an input x and output y) of the training data inputs and outputs of the private data set in the training data store 170. The training module 130 coordinates training of the training model parameters for its local computer model 150 (model training system 100A may update parameters of the computer model 150A) and may also evaluate other training model parameters (e.g., for computer models 150B, C) with respect to its local private data to generate and provide update gradients. After training of the computer models 150A-C and determining client weights for the private data set, the training module 130 generates parameters for an inference model 160 to be applied by an inference module 140.

Figure 2:
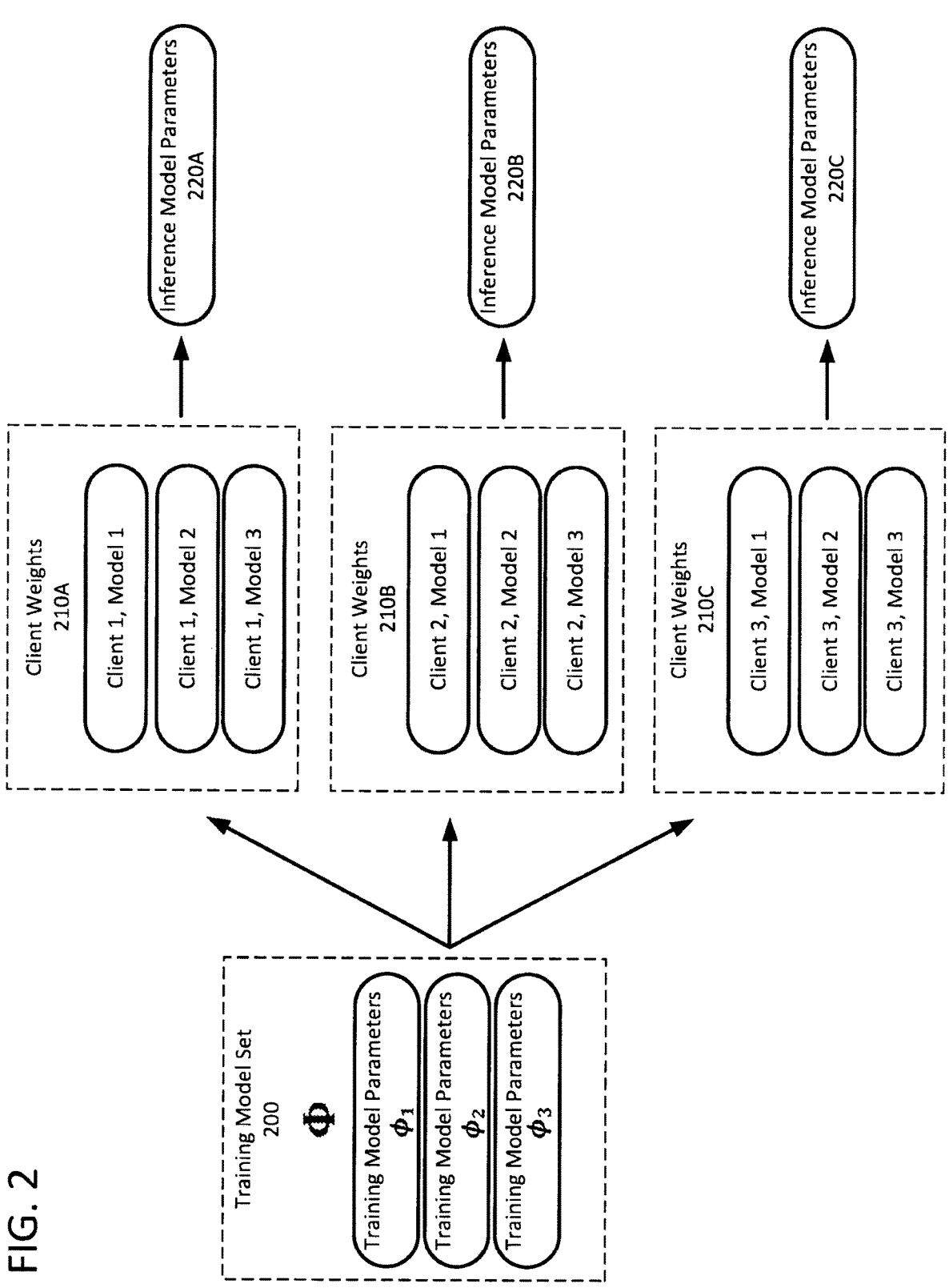
FIG. 2 illustrates generating inference model parameters based on training model parameters and client weights, according to one embodiment.

FIG. 2 illustrates generating inference model parameters based on training model parameters and client weights, according to one embodiment. Although in the distributed environment shown in FIG. 1 each entity may be responsible for updating a particular computer model 150, the collection of entities may be trained to learn respective client weights 210 for the different training model parameters (e.g., which may correspond to the different computer models 150A-C). The set of training model parameters for the various computer models 150A-C may be referred to as a training model set 200. Thus, although each entity updates training model parameters for a particular computer model 150, each set of client weights 210 includes a client weight with respect to each computer model (i.e., the respective training model parameters). As shown in FIG. 2, client weights 210A-C include (for the respective client and its private training data) a set of client weights for each of the corresponding training model parameters of the training model set 200. Thus, client weights 210A designate, for a client's private data set, respective weights for a first model, second model, and third model with corresponding model parameters in the training model set 200.

After training of parameters in the training model set 200 and the client weights 210A-C, the respective inference model parameters 220A-C are generated as a weighted mixture of the training model parameters according to the respective client weights. To generate the inference model parameters 220B for a second client, the client weights 210B are applied to weigh the respective training model parameters and combined. As such, although in the example of FIG. 1 each model training system may locally maintain and update training model parameters for a particular computer model, such as 150A, this model may be used by other participants in constructing respective inference model parameters for their respective private data sets. Hence, as the various training model parameters of the training model set 200 are jointly trained across the various participating systems, the training model parameters of the local computer model may not be optimized for the private data set. Rather, the "optimized" parameters for application to local private data is determined as the weighted combination of training model parameters according to respective client weights. The inference model parameters 220 are then stored for the inference model 160.

As another way to formally view this data, the training model set 200 may be represented as a training parameter matrix $\Phi$ of K training model parameters: $\Phi=[\Phi_i, \dots, \Phi_K]\in \mathbb{R}^{d\times k}$ for a model architecture having d model parameters, where K may represent the number of private data sets/ participating entities. The total number of client weights across all clients (e.g., the collection of client weights 210A-C) may thus be represented as a K×K client weight matrix, where each position in the matrix represents a weight wig for a particular client i and training model parameters $\Phi_j$. Although generally discussed herein with respect to distributed model training, embodiments include centralized processing and updates of a training parameter matrix and client weight matrix. In the centralized embodiment, individual clients may receive the training parameter matrix $\Phi$ to determine model update gradients with respect to each set of training model parameters $\Phi_i$ and provide the model update gradients with respect to that local data to a central system that processes updates to the client weight matrix and training parameter matrix $\Phi$ similar to the discussion below.

Returning to FIG. 1, the training module 130 coordinates training of the computer models 150A-C and the client weights for a private data set. In general, the models may be trained in one or more training iterations based on batches of training data from the training data store 170. Each training data instance may be processed by the current parameters of the model to determine a prediction from that model. The prediction by the model may be compared with the output labels associated with the training data instance to determine a loss according to a loss function, such as based on a difference of the model prediction with the desired prediction (i.e., the labeled outcome). The loss with respect to the data samples may then be used to determine parameter update gradients for the evaluated model describing modifications of the evaluated parameters that improve the loss function. Though generally referred to as a loss or with respect to a loss function, embodiments may more generally aim to improve any objective or desired measure of the model output that can be improved by modification of the model parameters. The update gradients may be determined in some embodiments by differentiating the loss for the data samples with respect to the model parameters. In some embodiments, the update gradients may be determined and/ or applied based on backpropagation of the loss to parameters at various layers of the model architecture.

As discussed further below, the training module 130 may receive training model parameters for computer models 150B, C, apply the parameters of the respective computer models to the private data set (e.g., a batch of training data for a particular training iteration) and to determine update gradients for the computer models 150B, C with respect to the local private data set. Similarly, the training model parameters for computer model 150A may be sent to other model training systems 100 and model update gradients may be received at model training system 100A for updating the computer model 150A based on application of its parameters to other private data sets. Information about specific data instances and other detailed information about the private data may thus be summarized in the update gradients, such that the private data itself is not shared. The training process for determining model update gradients may also incorporate further privacy-preserving processes, such as training approaches incorporating differential-privacy algorithms, which may provide further privacy guarantees for the private data while permitting sharing of overall model update gradients.

The communications module 120 may send and receive training model parameters, model update gradients, or other information to other model training systems 100 via a network 110 for training the computer models. For example, at one iteration of the training process, the model training system 100A may send parameters of the computer model 150A to the model training system 100B and receive training model parameters of the computer model 150C from model training system 100C.

After training, the models may then be used to predict outcomes for new private data instances (i.e., instances that were not part of the training data set). In general, after training, the inference model 160 may be used for subsequent predictions. An inference module 140 may receive such new data instances and apply the inference model 160 to predict outcomes for the data instance. Typically, the participant operating each model training system 100 may apply its inference model 160 to data instances received by that participant; for example, a medical practice may apply its inference model 160 to new patients of that medical practice. Though shown as a part of the model training system 100A, the inference module 140 and application of the inference model 160 to generate predictions of new data may be implemented in various configurations in different embodiments. For example, in some embodiments the inference module 140 may receive data from another computing system, apply the inference model 160, and provide predictions in response. In other examples, the inference model 160 may be distributed to various systems (e.g., operated by the participant) for application to data instances locally.

Figure 3:
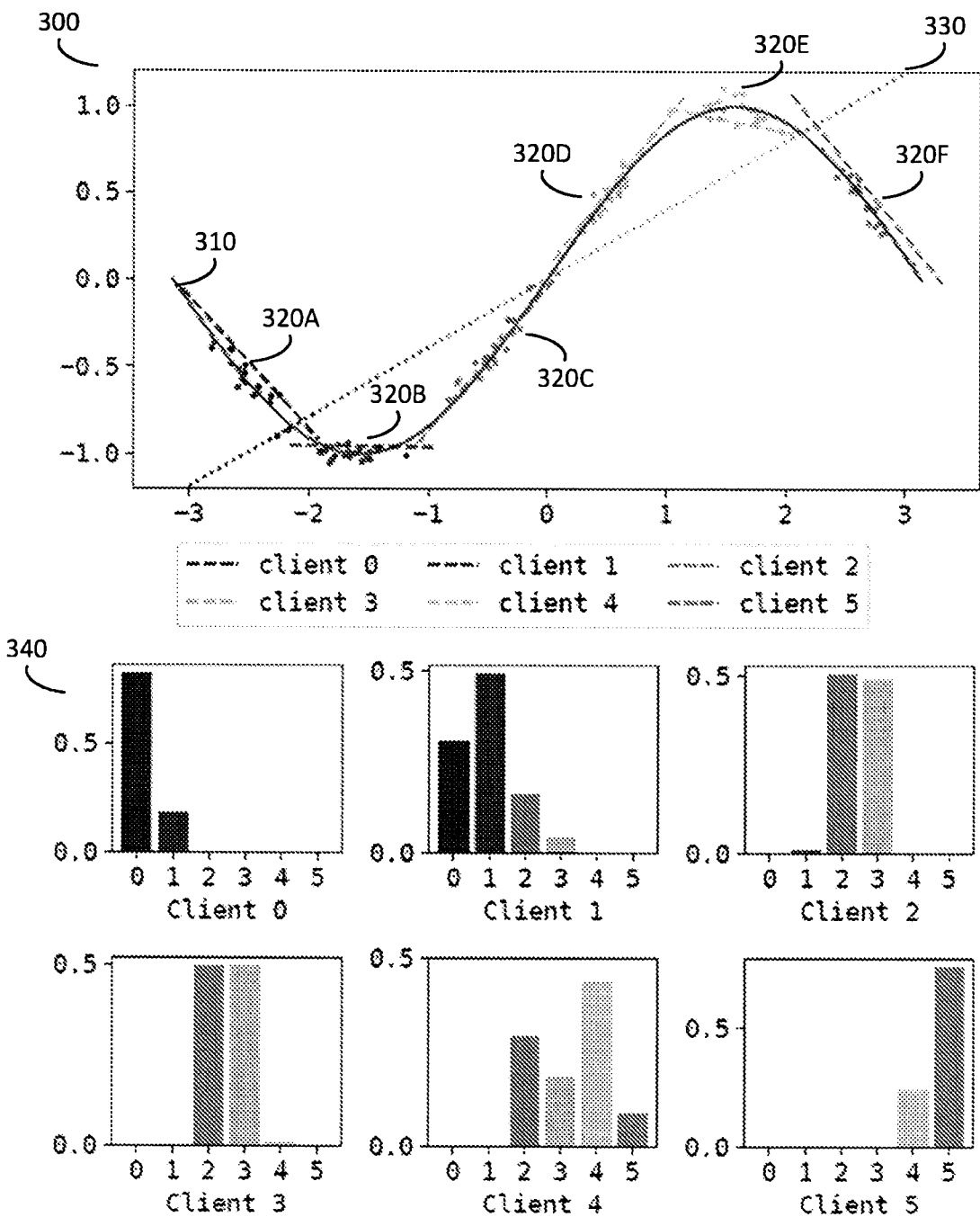
FIG. 3 illustrates an example plot of related data sets with associated mixtures 340 of client weights.

FIG. 3 illustrates an example plot 300 of related data sets 320A-F with associated mixtures 340 of client weights. This example plot 300 shows a simple scenario where an increasing sinusoidal wave 310 is used to generate data points in which points generated for different segments are assigned as data sets 320A-F for each of six clients. In this example, each client seeks to learn a linear model to its limited data on an interval of data points. This is analogous to several participating clients that would like to collaborate, but each client only has access to data from its own data distribution. Approaches that attempt to learn a single model, for the different data sets may yield a global model, represented as a line 330, that fails to represent any individual group of private data well. This simple example shows how the potential benefits of collaboration can be lost when a global model is used without properly accounting for differences in individual private data sets.

By modeling the data with the distributed models and client weights as discussed herein, each client may learn the "right" collaborators, enabling models to learn local private data sets and benefit from information of neighboring clients to the extent it is beneficial. The mixtures 340 show the respective learned client weights for each client in incorporating information from other data sets to effectively learn a local model.

FIGS. 4A-D illustrate steps for an iteration of a training process for distributed model training with heterogenous private model data, according to one embodiment. The example of FIG. 4 shows four model training systems 400A-D, each of which may have respective training model parameters 410A-D, local client weights 420A-D, and local data 430A-D. Each set of client weights 420A-D may reflect weights for the respective weights for the private data in local data 430A-D.

The training model parameters 410A-D and local client weights 420A-D are trained across a number of training iterations using at least a portion of the respective local data 430A-D as a batch of training data in each iteration. In general, the training process shown in FIGS. 4A-D is performed in two main steps: first, to update local client weights 420A-D, and second, to update model gradients. In each iteration, these steps may be performed with respect to one or more sampled models (i.e., the training model parameters of these models). In the example of FIGS. 4A-4D, communication and other processing steps are shown and discussed with respect to model training system 400A; equivalent steps are also performed by model training systems 400B-D.

Figure 4A:
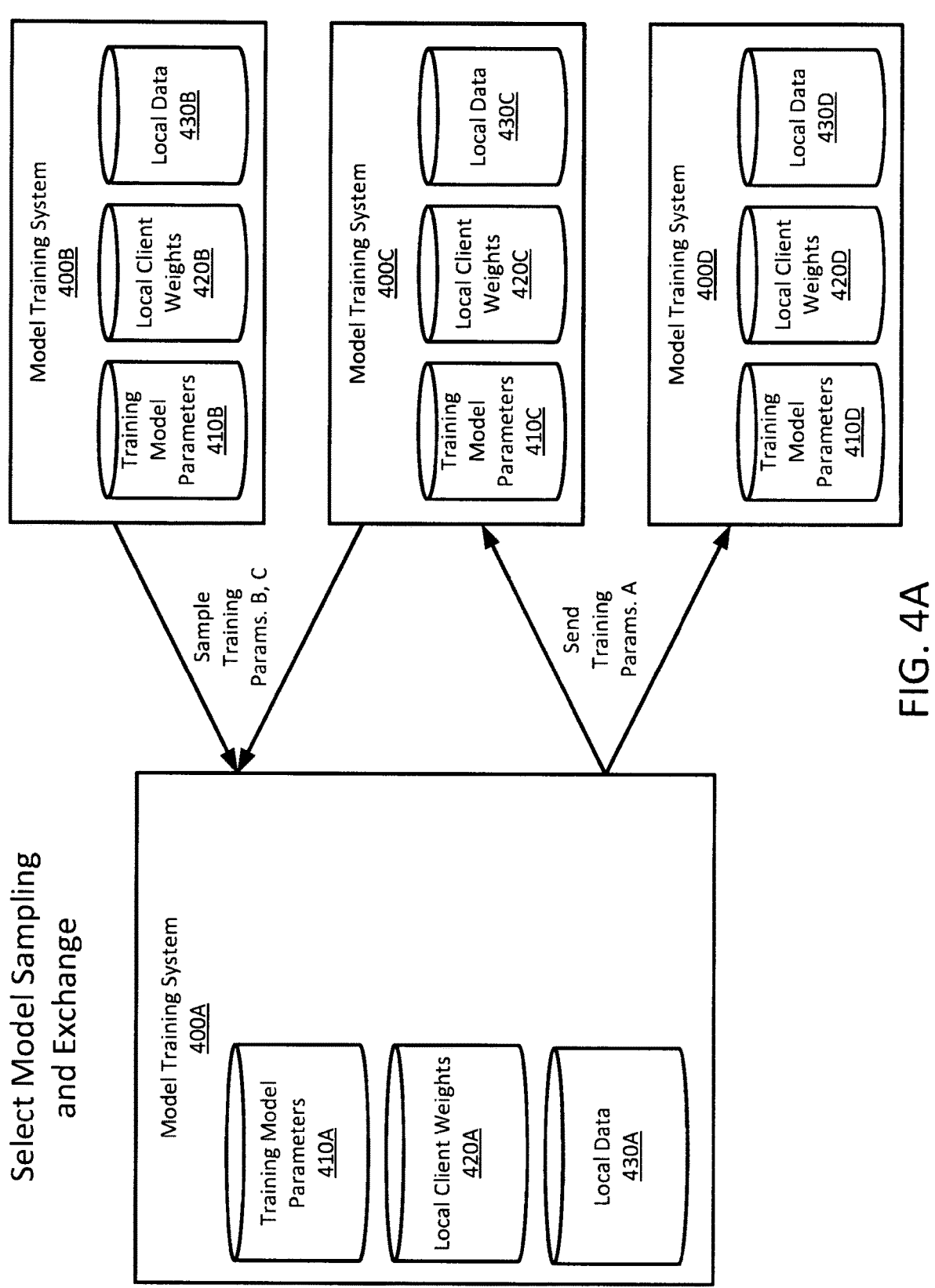

Initially, a number of models are selected to update in a particular iteration by sampling from the set of models. For convenience, in this discussion, sampling, applying, or otherwise interacting with a "model" may refer to the model as characterized by its the related training model parameters. For example, "applying a model" may refer to applying the associated model training parameters of a designated model. In the example of FIG. 4A, model training system 400A determines to samples model B and C, requesting the training model parameters from model training systems 400B, C, and receiving training sample parameters 410B, C. Similarly, model training systems 400C, D sample the model of model training system 400A, which sends training model parameters 410A to model training systems 400C, D. The number of sampled models in a particular iteration may vary, and in some configurations may be specified by a hyperparameter of the training process. In addition, although not explicitly shown in FIGS. 4A-4D, a model training system 400 may sample its own model, for example as one of the models in the set of models to be sampled from. As such, in some iterations the sampled models may include its model (i.e., local training parameters 410A) and in other iterations the sampled models include only models from other model training systems 400.

In some embodiments, the selection of sampled models may be pre-determined (e.g., as a specified rotation or other varying deterministic process), may be uniformly sampled, or may be sampled based on the local client weights 420. When sampling based on the local client weight 420, models associated with relatively higher client weights may be more likely to be sampled, such that the models previously considered more similar to the local data 430 are sampled. In one embodiment, the sampling may be a combination of sampling based on client weights and uniform model sampling. In one embodiment, the combination of these approaches is termed a "ε-greedy" in which a parameter $\epsilon \in [0,1]$ is used to select the proportional frequency of sampling uniformly or by client weight. This may allow for sampling both of the models expected to have high similarity to the local data 430A and continuing evaluation of other models, which may have changed compared to its prior sample.

As shown in FIG. 4B, the sampled models 440 are then evaluated with respect to the local data 430A to update the local client weights 420A for the private data of model training system 400A. The respective model training parameters 410B, C, are applied to training data samples to determine the extent to which they predict the private data set, which may be based on the loss of each model as applied to the local data 430A. The local client weights may sum to 1, such that the client weights may be set based on the relative loss for model. In one embodiment, a loss function $$\ell_{ib}^{(t)}$$

for client weights of client i for sampled model b having training model parameters $$\phi_b^{(t)}$$

at iteration t across a number of training data instances $n_i$ is:

$$\ell_{ib}^{(t)} = \sum_{s=1}^{n_i} \ell\left( h_{\phi_b^{(t)}}\left(x_s^{(i)}\right), y_s^{(i)} \right)$$

Equation 1 in which $$h_{\phi_b^{(t)}}$$

is an evaluation function h( ) with computer model parameters $$\phi_b^{(t)}.$$

In one embodiment, a set of model losses may be stored describing the loss of each model. When a model is sampled, the loss for that model is updated in the set of losses based on the evaluation of that model with respect to the local data 430. In this embodiment, the local client weights may be updated based on the relative proportional loss for each model in the set of losses, such that a model's client weight may be inversely related to a model's loss.

In additional embodiments, the loss may be represented as a moving average, such as an exponential moving average, that adjusts the loss at each iteration according to a momentum hyperparameter $\beta$. The stored set of losses may store the moving average, such that the moving average may be updated based on the loss evaluated at this iteration. In one embodiment, the exponential moving average $$\hat{L}_{ij}^{(t)}$$

for client i and model j at iteration t is determined by:

$$\hat{L}_{ij}^{(t)} = (1 - \beta)\hat{L}_{ij}^{(t-1)} + \beta \boldsymbol{\ell}_{ij}^{(t)} \qquad \text{Equation 2}$$

Incorporating the exponential moving average may prevent a small number of training iterations from overly affecting the loss associated with a model, reducing the likelihood that early initializations overly affect sampling based on client weights.

As one embodiment for setting the client weights, an individual client weight $$w_{ij}^{(t)}$$

for client i and model j at iteration t may be set according to:

$$w_{ij}^{(t)} = \frac{\exp\left(\hat{L}_{ij}^{(t)}\right)}{\sum_{ij'=1}^{K} \exp\left(\hat{L}_{ij'}^{(t)}\right)} \qquad \text{Equation 3}$$

In which $$\hat{L}_{ij'}^{(t)}$$

is the loss for client i of models other than j.

Figure 4C:
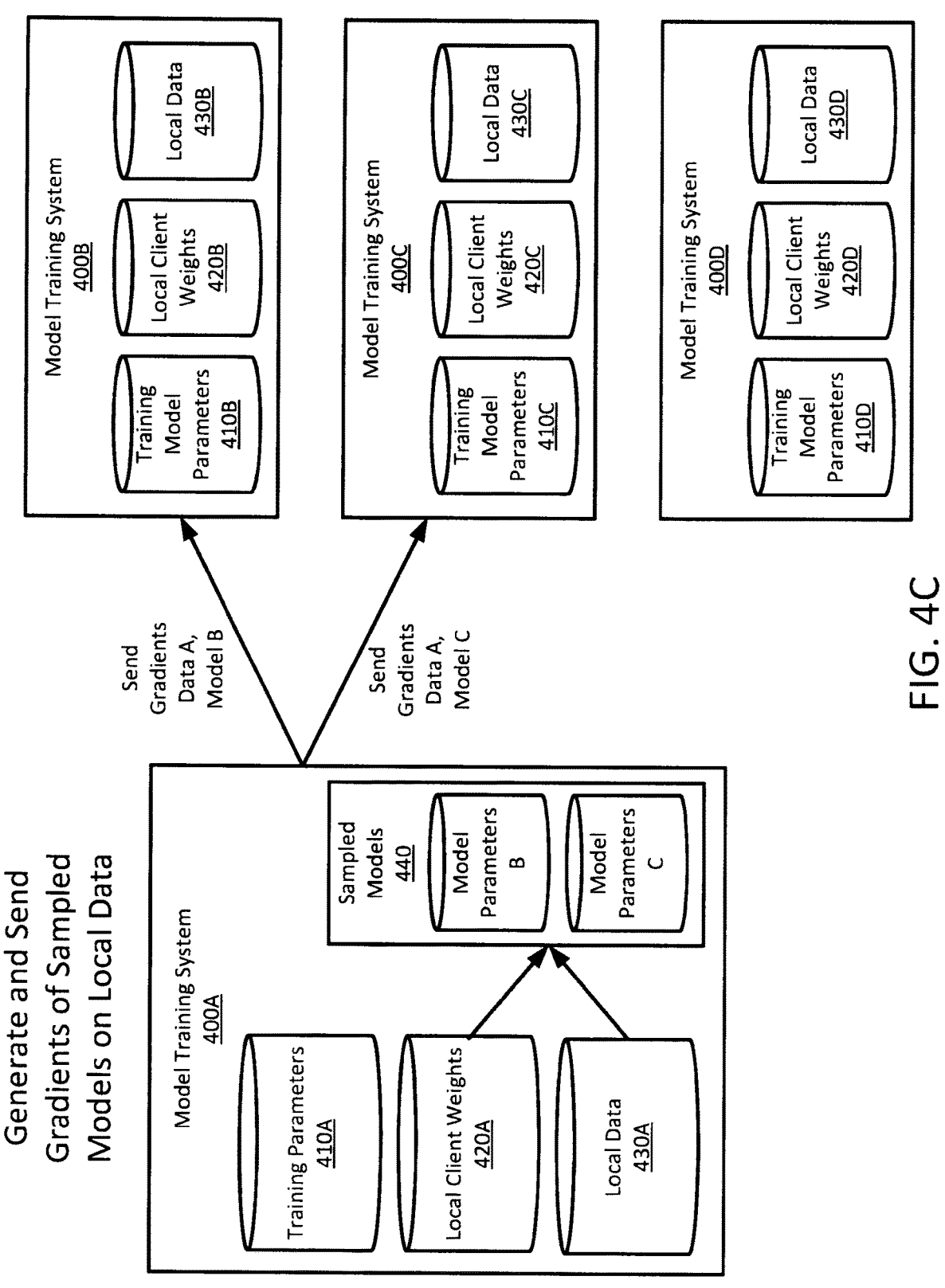

After updating the client weights, FIG. 4C model update gradients are determined for the sampled models 440. The gradients may be determined as discussed above based on the loss of evaluated local data samples differentiated with respect to the sampled model training parameters. In addition, the update gradients for each sampled model may be adjusted according to the respective local client weight for that model. The client weight may be used after being updated in the current iteration. As a result, although the model update gradients are generated, they may be modified (e.g., increased or reduced) based on the associated client weight for the client with respect to the sampled model. As the client weight may be considered to describe the similarity of a model to the local data, this means that model gradients for the sampled models may flexibly account for the similarity model to the local data. This enables the model to more significantly account for model gradients based on private data more-predicted by the model and reduce model gradients based on private data less-predicted by the model. This may prevent, for example, a model that may be predictive of a first and second group to be strongly affected by gradients generated by a private data set that significantly differs from the first and second groups. The respective model update gradients for the sampled models and as adjusted by the client weights, is sent to the respective model training systems 400B, C for updating the respective training model parameters 410B, C.

Figure 4D:
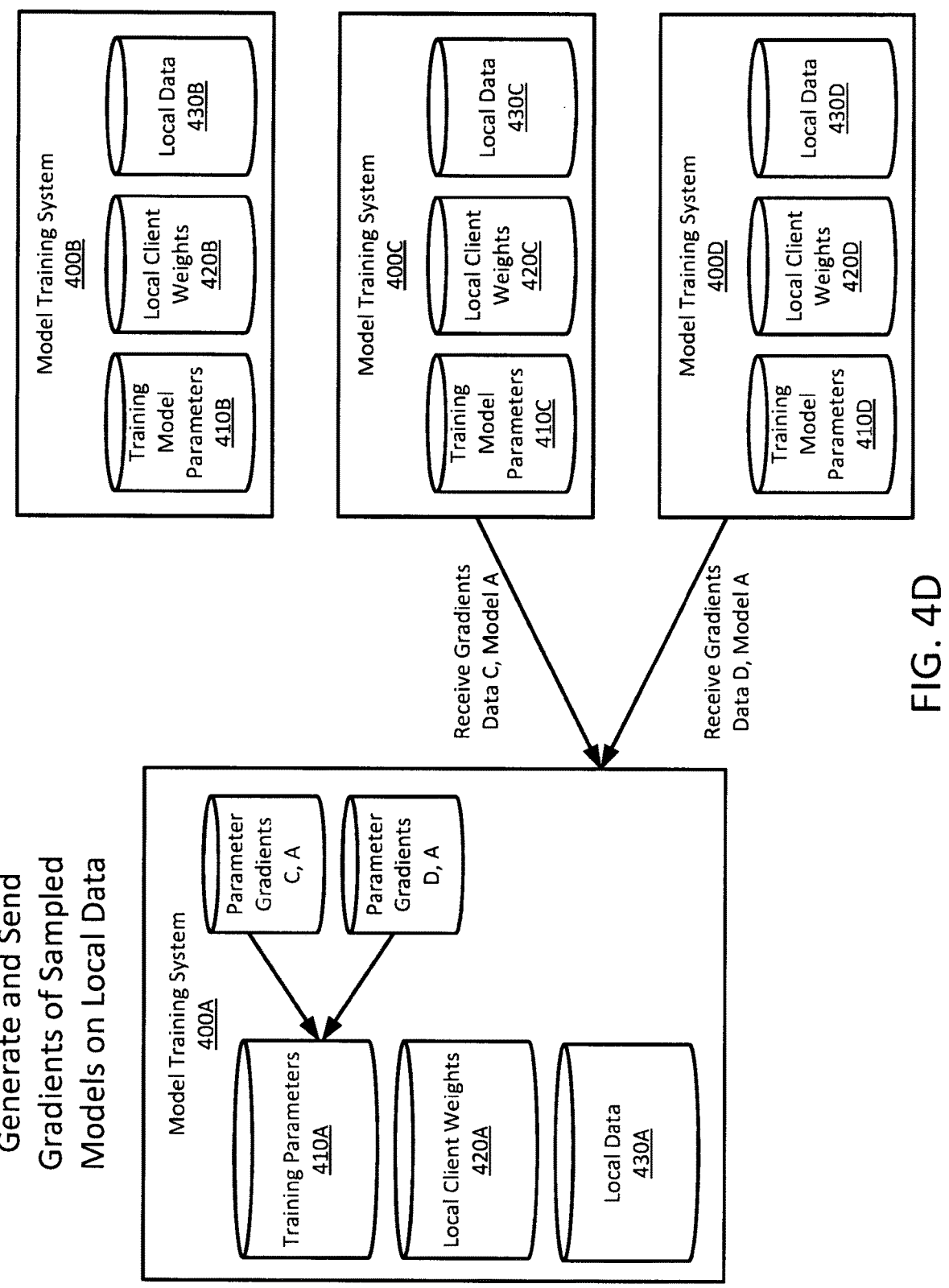

Similarly, updated parameters are received from the model training systems that sampled the local training parameters 410A as shown in FIG. 4D. Finally, the training parameters 410A may be updated by incorporating the parameter update gradients received from model training systems 400C, D. These update gradients reflect gradients to the training parameters 410A based on application of the respective private data (local data 430C, D). As with the gradients sent by the model training system 400A, the received model update gradients are weighed by the respective local client weight 420C, D, such that the received model update gradients may also account for the relative predictive value of the training parameters 410A with respect to the local training data 430C, D.

Figure 5:
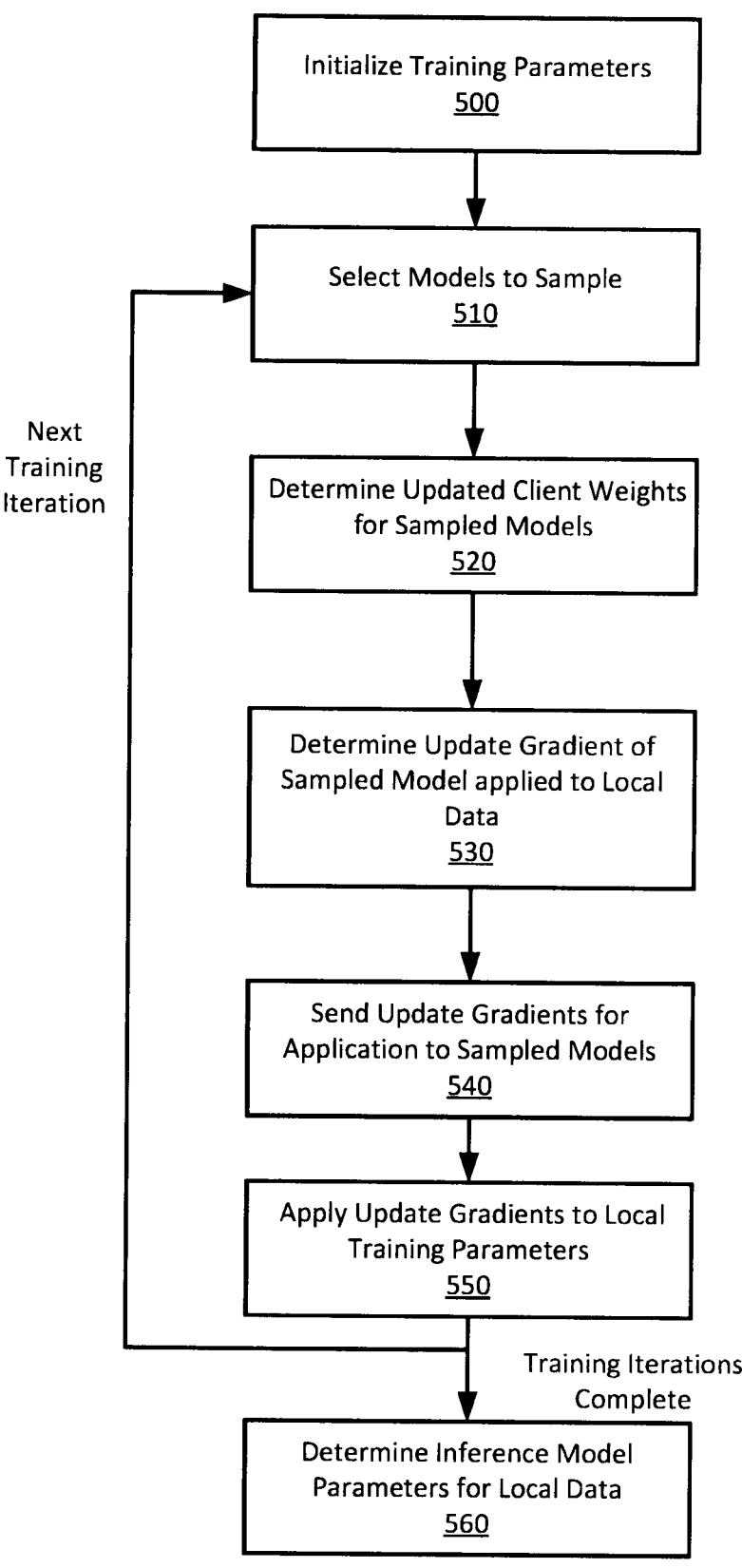
FIG. 5 shows a flowchart for computer model training based on separate private data sets, according to one embodiment.

FIG. 5 shows a flowchart for computer model training based on separate private data sets, according to one embodiment. The process shown in FIG. 5 may be performed by components of a model training system 100, such as a training module 130 and are discussed from the perspective of a particular model training system 100 in a distributed training environment. To begin, parameters may be initialized 500, such as the model parameters, client weights, losses, and moving averages. Next, a number of training iterations is performed that include updating client weights and updating model parameters as just discussed with respect to FIG. 4. First, models to sample for the iteration are selected 510 according to a selection algorithm, such as a uniform sampling, based on the client weights, or a combination of the two. The parameters of the sampled models are retrieved, and locally-stored model parameters may be provided to systems that have sampled the local model in this iteration.

For each of the sampled models, updated client weights are determined 520 as discussed above, and may include evaluating a loss for the sampled models as applied to the local data (i.e., private data to the local training system). In one embodiment, a set of client weights is re-calculated based on the loss for the sampled models, such that the client weight are normalized to sum to 1.

Next, the loss for a sampled model with respect to the local data is used to determine 530 an update gradient for the sampled model. The update gradient is adjusted based on the client weights as updated in the current iteration and the model training system sends 540 the update gradient(s) to the respective system(s) maintaining the sampled model(s).

Finally, model update gradients are received from the systems that sampled the local model and applied the local model parameters to the private data of those systems. The received gradients are then applied 550 to the local computer model and update training model parameters. Additional iterations may then be initiated by selecting 510 models for the next sampling and update.

After the training iterations are complete (e.g., determined based on a total number of iterations, convergence, or another metric), an inference model is determined 560 based on the client weights for the private data and training model parameters of the various models. The training model parameters for each model are combined according to the client weights, enabling the inference model to account for aspects of each model.

Using this approach, inference models may be trained across different collaborators, all of whom maintain data privacy, while each system flexibly learns the relative importance of the different training models while the training models are also updated.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A system for distributed learning of computer model parameters for private client data, comprising:
   one or more processors;
   one or more non-transitory computer-readable media containing instructions executable by the one or more processors for:
      selecting one or more sampled computer models to sample in a training iteration, each of the one or more sampled computer models being selected from a plurality of computer models having the same model architecture and each computer model having an associated client weight and a set of training parameters describing values for applying the respective computer model, wherein one of the plurality of computer models is a local model;
      for each sampled computer model:
         updating the client weight for the computer model based on the computer model applied to the private data set according to the associated set of training parameters;
         determining an update gradient for the sampled model as applied to the private data set and weighed based on the updated client weight; and
         sending the update gradient for application to the sampled computer model; and
      sending the local model to another computer model training system having another private data set;
      receiving an update gradient for the local model with respect to the local model applied to the other private data set weighed by a client weight of the other model for the local model;
      updating the local model based on the update gradient; and
      determining parameters for an inference model for performing inference of a private local data sample by combining training parameters of the plurality of computer models in proportion to the associated client weights.

2. The system of claim 1, wherein the sampled models from the plurality of computer models is selected based, in part, on the client weight of the sampled models.

3. The system of claim 1, wherein updating the client weight for a sampled computer model comprises:
   determining a loss function with respect to the sampled computer model applied to the private data set.

4. The system of claim 3, wherein updating the client weight further comprises:
   updating a plurality of loss functions based on the loss function with respect to the sampled computer model; and wherein the client weight is updated based on the updated plurality of loss functions.

5. The system of claim 3, wherein updating the client weight for a sampled computer model comprises:
determining a moving average of the loss function and updating the client weight based on the moving average.

6. The system of claim 1, wherein the one or more sampled computer models include a local model and at least one computer model at another computer model training system.

7. A method for distributed learning of computer model parameters for private client data, comprising:
selecting one or more sampled computer models to sample in a training iteration, each of the one or more sampled computer models being selected from a plurality of computer models having the same model architecture and each computer model having an associated client weight and a set of training parameters describing values for applying the respective computer model, wherein one of the plurality of computer models is a local model;
for each sampled computer model:
updating the client weight for the computer model based on the computer model applied to the private data set according to the associated set of training parameters;
determining an update gradient for the sampled model as applied to the private data set and weighed based on the updated client weight; and
sending the update gradient for application to the sampled computer model; and
sending the local model to another computer model training system having another private data set;
receiving an update gradient for the local model with respect to the local model applied to the other private data set weighed by a client weight of the other model for the local model;
updating the local model based on the update gradient; and
determining parameters for an inference model for performing inference of a private local data sample by combining training parameters of the plurality of computer models in proportion to the associated client weights.

8. The method of claim 7, wherein the sampled models from the plurality of computer models is selected based, in part, on the client weight of the sampled models.

9. The method of claim 7, wherein updating the client weight for a sampled computer model comprises:
determining a loss function with respect to the sampled computer model applied to the private data set.

10. The method of claim 9, wherein updating the client weight further comprises:
updating a plurality of loss functions based on the loss function with respect to the sampled computer model; and
wherein the client weight is updated based on the updated plurality of loss functions.

11. The method of claim 9, wherein updating the client weight for a sampled computer model comprises:
determining a moving average of the loss function and updating the client weight based on the moving average.

12. The method of claim 7, wherein the one or more sampled computer models include a local model and at least one computer model at another computer model training system.

13. A non-transitory computer-readable medium for distributed learning of computer model parameters for private client data, the non-transitory computer-readable medium comprising instructions that, when executed by a processor, cause the processor to:
select one or more sampled computer models to sample in a training iteration, each of the one or more sampled computer models being selected from a plurality of computer models having the same model architecture and each computer model having an associated client weight and a set of training parameters describing values for applying the respective computer model, wherein one of the plurality of computer models is a local model;
for each sampled computer model:
update the client weight for the computer model based on the computer model applied to the private data set according to the associated set of training parameters;
determine an update gradient for the sampled model as applied to the private data set and weighed based on the updated client weight; and
send the update gradient for application to the sampled computer model; and
send the local model to another computer model training system having another private data set;
receive an update gradient for the local model with respect to the local model applied to the other private data set weighed by a client weight of the other model for the local model;
update the local model based on the update gradient; and
determine parameters for an inference model for performing inference of a private local data sample by combining training parameters of the plurality of computer models in proportion to the associated client weights.

14. The non-transitory computer-readable medium of claim 13, wherein the sampled models from the plurality of computer models is selected based, in part, on the client weight of the sampled models.

15. The non-transitory computer-readable medium of claim 13, wherein updating the client weight for a sampled computer model comprises:
determining a loss function with respect to the sampled computer model applied to the private data set.

16. The non-transitory computer-readable medium of claim 15, wherein updating the client weight further comprises:
updating a plurality of loss functions based on the loss function with respect to the sampled computer model; and
wherein the client weight is updated based on the updated plurality of loss functions.

17. The non-transitory computer-readable medium of claim 15, wherein updating the client weight for a sampled computer model comprises:
determining a moving average of the loss function and updating the client weight based on the moving average.

* * * * *